(12) United States Patent
Lv et al.

(10) Patent No.: US 10,961,830 B1
(45) Date of Patent: Mar. 30, 2021

(54) WATERLESS FOAM GENERATOR FOR FRACTURING SHALE OIL AND GAS RESERVOIRS AND USE THEREOF

(71) Applicant: CHINA UNIVERSITY OF PETROLEUM—BEIJING, Beijing (CN)

(72) Inventors: Qichao Lv, Beijing (CN); Rong Zheng, Beijing (CN); Tongke Zhou, Beijing (CN); Zhaoxia Dong, Beijing (CN); Juan Zhang, Beijing (CN); Zihao Yang, Beijing (CN); Meiqin Lin, Beijing (CN)

(73) Assignee: CHINA UNIVERSITY OF PETROLEUM—BEIJING, Beijing (CN)

(*) Notice: Subject to any disclaimer, the term of this patent is extended or adjusted under 35 U.S.C. 154(b) by 0 days.

(21) Appl. No.: 17/033,580

(22) Filed: Sep. 25, 2020

(30) Foreign Application Priority Data

Nov. 20, 2019  (CN) .......................... 201911138285.4

(51) Int. Cl.
*E21B 43/16* (2006.01)
*E21B 43/267* (2006.01)
*E21B 21/06* (2006.01)
*C09K 8/70* (2006.01)

(52) U.S. Cl.
CPC .......... *E21B 43/164* (2013.01); *E21B 21/062* (2013.01); *E21B 21/068* (2013.01); *E21B 43/267* (2013.01); *C09K 8/703* (2013.01)

(58) Field of Classification Search
CPC ....... C09K 8/512; C09K 8/685; E21B 21/066; E21B 43/267; E21B 21/00; E21B 43/34
See application file for complete search history.

(56) References Cited

U.S. PATENT DOCUMENTS

| 10,017,686 | B1 | 7/2018 | Babcock |
| 10,428,263 | B2 * | 10/2019 | Babcock ................ C09K 8/703 |
| 2009/0183874 | A1 | 7/2009 | Fordyce |

(Continued)

FOREIGN PATENT DOCUMENTS

| CN | 102094614 A | 6/2011 |
| CN | 102493767 A | 6/2012 |

(Continued)

OTHER PUBLICATIONS

The first Office Action of the priority CN application.

*Primary Examiner* — Zakiya W Bates
(74) *Attorney, Agent, or Firm* — J.C. Patents

(57) ABSTRACT

The present disclosure discloses a waterless foam generator for fracturing shale oil and gas reservoirs and use thereof. The structure of the waterless foam generator includes: a top of the proppant storage tank is provided with a proppant inlet, a second feed port of liquid $CO_2$ and a safety valve, and a bottom of the proppant storage tank is connected to the high-pressure gas-liquid-solid mixer, a side wall of the high-pressure gas-liquid-solid mixer is provided with a first feed port of liquid $CO_2$, an feed port of $N_2$ and an feed port of waterless foam foaming agent, and the high-pressure gas-liquid-solid mixer is connected to the first shaker of waterless foam fracturing fluid, the first shaker of waterless foam fracturing fluid, the second shaker of waterless foam fracturing fluid and the third shaker of waterless foam fracturing fluid are connected in sequence.

6 Claims, 2 Drawing Sheets

(56) References Cited

U.S. PATENT DOCUMENTS

2010/0044048 A1* 2/2010 Leshchyshyn ........... C09K 8/88
                                                  166/308.1
2018/0044573 A1* 2/2018 Perry .................... C09K 8/602

FOREIGN PATENT DOCUMENTS

| CN | 103711468 A | 4/2014 |
| CN | 105971573 A | 9/2016 |
| CN | 107109204 A | 8/2017 |
| CN | 206987796 U | 2/2018 |
| CN | 108329900 A | 7/2018 |
| CN | 109519135 A | 3/2019 |

* cited by examiner

WATERLESS FOAM GENERATOR FOR FRACTURING SHALE OIL AND GAS RESERVOIRS AND USE THEREOF

CROSS-REFERENCE TO RELATED APPLICATION

This application claims priority to Chinese Patent Application No. 201911138285.4, filed on Nov. 20, 2019, which is hereby incorporated by reference in its entirety.

TECHNICAL FIELD

The present application relates to the field of fracturing equipment technology for development and utilization of shale oil and gas, and in particular, to a waterless foam generator for fracturing shale oil and gas reservoirs and use thereof.

BACKGROUND

The efficient development of shale oil and gas reservoirs is of strategic significance for the optimization of oil and gas energy composition. However, generally, shale oil and shale gas formations suffered to problems such as small matrix pores and extremely low permeability. It is difficult to achieve effective development and utilization of shale oil and gas using conventional oil and gas development methods. Because of the inherent disadvantages of shale oil and gas reservoirs, fracturing is an inevitable way to achieve industrial production and utilization of them, while the vulnerability of the reservoir puts forward strict requirements for reservoir protection. Most of traditional water-based fracturing fluids use polymers as thickeners, and those fracturing fluids are suffered to problems, such as difficulty in gel breaking, high residue content, clay expansion and poor capacity of flow back. Those problems will easily cause low-productivity of wells after fracturing stimulation of the reservoirs. In addition, the process of water-based fracturing stimulation consumes high amounts of water and has various types of potential pollutions to groundwater, surface water and soil. Therefore, developing an efficient and environmental fracturing technology with low water consumption, low reservoir damage is the key to efficiently develop the shale oil and gas. The waterless foam fracturing fluid is the highly energized fluid formed with liquid $CO_2$ as an external phase and $N_2$ as an internal phase. Since the system is almost entirely composed of gas, the water consumption and pollution caused by fracturing are greatly reduced, and there is no polymer residue in the system, the system has good compatibility with shale reservoirs, completely avoiding the damage of fracturing fluid to formation, and it has great application prospects in the development and utilization of the shale oil and gas reservoirs.

Fully mixing liquid $CO_2$ and high-pressure $N_2$ to form foam fluid is one of the keys to the waterless foam fracturing technology. Traditional foam generators are mainly designed for water-based foam, and there are less patents or research reports on waterless foam generators. And there is a big difference between a water/gas system in water-based foam and a liquid $CO_2/N_2$ system in waterless foam, which also makes it difficult for traditional water-based foam generators to meet the requirements for efficient generation of waterless foam. First of all, both liquid $CO_2$ and $N_2$ are non-polar molecules, the types of foaming agents for waterless foam are obviously different from those of traditional water-based foam systems, and the types of foaming agents that can be selected are very limited. There is relatively small space for optimizing the foaming capacity of the foaming agent itself. Therefore, a foam generator with stronger mixing capacity is required for liquid $CO_2$ and $N_2$ to produce uniform and dense waterless foam fracturing fluid. At the same time, different from traditional foams that contain water, the physical properties of waterless foam, such as the viscosity and density and interfacial tension of liquid $CO_2$, are extremely sensitive to temperature, so a certain temperature control capability is required for the foam generator during the foam generation. In addition, an important role of the waterless foam fracturing fluid is to transport proppant into the fractured shale, in order to construct an efficient flow channel for shale oil and gas, which puts forward higher requirements for the waterless foam generator on ground: while mixing liquid $CO_2$ and $N_2$ to form waterless foam fracturing fluid, the concentration of the proppant in the waterless foam fracturing fluid can also be controlled, and the generator can withstand the strong abrasion of the proppant in the high flowing fracturing fluid.

SUMMARY

The purpose of the present disclosure is to provide a waterless foam generator for fracturing shale oil and gas reservoirs and use thereof. The foam generator overcomes the shortcomings of existing devices which are difficult to form waterless foam fracturing fluid. And it can produce a waterless foam system with $N_2$ uniformly dispersed in liquid $CO_2$, at the same time it can complete the intensive mixing of waterless foam fluid and proppant under a high pressure condition, and can also control the proppant concentration in the waterless foam, thereby being able to produce a waterless foam fracturing fluid system which is suitable for the development of shale oil and gas.

The waterless foam generator for fracturing shale oil and gas reservoirs provided by the present disclosure includes a proppant storage tank, a high-pressure gas-liquid-solid mixer, a first shaker of waterless foam fracturing fluid, a second shaker of waterless foam fracturing fluid, and a third shaker of waterless foam fracturing fluid;

a top of the proppant storage tank is provided with a proppant inlet, a second feed port of liquid $CO_2$ and a safety valve, and a bottom of the proppant storage tank is connected to the high-pressure gas-liquid-solid mixer through a proppant discharge pipe;

the top of the proppant storage tank is connected to both the second shaker of waterless foam fracturing fluid and the third shaker of waterless foam fracturing fluid through a gas discharge pipe;

a side wall of the high-pressure gas-liquid-solid mixer is provided with a first feed port of liquid $CO_2$, a feed port of $N_2$ and a feed port of waterless foam foaming agent;

the high-pressure gas-liquid-solid mixer is connected to the first shaker of waterless foam fracturing fluid through a liquid discharge pipe, the first shaker of waterless foam fracturing fluid, the second shaker of waterless foam fracturing fluid and the third shaker of waterless foam fracturing fluid are connected in sequence;

the first shaker of waterless foam fracturing fluid is a rectangular pipeline, where triangle protrusions are alternately formed on two opposite side walls of the rectangular pipeline;

the second shaker of waterless foam fracturing fluid is a circular pipeline, where a plurality of arc-shaped Venturi tubes are formed along the inner wall of the circular pipeline;

the third shaker of waterless foam fracturing fluid is a circular pipeline, where a plurality of arc-shaped Venturi tubes are formed along the inner wall of the circular pipeline, and a plurality of arc-shaped mini-Venturi tubes are arranged, in honeycomb briquet shape, at an end of a radially enlarged tube of each of the arc-shaped Venturi tubes;

the third shaker of waterless foam fracturing fluid is connected to a discharge pipe of waterless foam.

In the above-mentioned waterless foam generator, a hydraulic sealing gate which is configured to control discharge amount of the proppant is arranged within the proppant storage tank;

the hydraulic sealing gate includes a hydraulic cylinder arranged in the proppant storage tank, a hydraulic shaft connected to the hydraulic cylinder, an oil inlet fixed on a top of the hydraulic shaft and a hydraulic gate fixed at a bottom of the hydraulic shaft, and the discharge amount of the proppant is controlled by upward or downward movement of the hydraulic gate;

a sealing ring, such as a graphite sealing ring, is arranged between the hydraulic cylinder and the hydraulic shaft, in order to achieve beneficial effects of resistance to the erosion of liquid $CO_2$ and high pressure.

In the above-mentioned waterless foam generator, the bottom of the proppant storage tank has a shape of a conical funnel, a cone apex of which is connected to the proppant discharge pipe.

In the above-mentioned waterless foam generator, the second feed port of liquid $CO_2$ is configured to carry proppant out of the proppant storage tank. And the advantages of the design here include: liquid $CO_2$ is the external phase of the waterless foam fracturing fluid. The density and viscosity of liquid $CO_2$ are high, and its dosage of is large, thus it can carry proppant into the high-pressure gas-liquid-solid mixer through the gate, so as to prevent accumulation of the proppant, and make them flow smoothly in the storage tank, avoiding blocking the gate.

The proppant inlet is configured to add proppant into the proppant storage tank; the safety valve is configured to prevent excessively high pressure in the proppant storage tank, and release pressure in time by discharging $CO_2$; the gas discharge pipe is configured to cool the shaker with liquid $CO_2$.

In the above-mentioned waterless foam generator, both the circular pipeline and the rectangular pipeline are steel pipes, an outer surface of the steel pipe is provided with a thermal insulation layer, and an inner surface of the steel pipe is inlaid with a wear-resistant ceramic layer, having effects of erosion resistance, pressure resistance and corrosion resistance;

the material of the steel pipe can be 16 Mn steel;

in the above-mentioned waterless foam generator, the function of the high-pressure gas-liquid-solid mixer is to implement the first preliminary mixing of liquid $CO_2$, $N_2$ and proppant; proppant filters are provided at outlets of the first feed port of liquid $CO_2$ and the feed port of $N_2$, the preliminarily mixed waterless foam fracturing fluid enters the first shaker of waterless foam fracturing fluid through the proppant filters and the liquid discharge pipe.

The mesh number of the proppant filter can be 150-300, and according to the process requirements, proppant filters with different mesh numbers can be used to achieve the beneficial effect of optimizing fracturing operation.

In the above-mentioned waterless foam generator, the function of the first shaker of waterless foam fracturing fluid is to change the flow state of the waterless foam fracturing fluid, slow the erosion of the fracturing fluid on the pipe wall, cause liquid $CO_2$ to be the external phase to initially wrap $N_2$, and make proppant disperse evenly in the liquid $CO_2$.

An apex angle of the triangle protrusion can be 110°-130°, preferably 120°;

the external width and height of the rectangular pipeline of the first shaker of waterless foam fracturing fluid can be 10.00 cm-13.00 cm; and the total length of the pipeline can be 60.00 cm-100.00 cm.

Furthermore, 5-6 staggered triangle protrusions are arranged in the first shaker of waterless foam fracturing fluid, the apex angle is 115°-125°, the height is 2.50 cm-3.50 cm; the total length of the pipeline can be 80.00 cm-85.00 cm, the side length of external steel body is 10.00 cm-10.50 cm, and the thickness is 2.25 cm. The preferred angle and structure in the present disclosure change the flow state of the waterless foam fracturing fluid, using turbulence to generate oscillation and preliminary mixing of the three phases including $N_2$, proppant, and liquid $CO_2$, while reducing the erosion of the fracturing fluid on the pipe wall, and initially dispersing $N_2$ and proppant uniformly in the liquid $CO_2$.

In the above-mentioned waterless foam generator, the second shaker of waterless foam fracturing fluid includes 4-10 arc-shaped Venturi tubes that are evenly spaced. The function of the arc-shaped Venturi tubes is to vibrate sufficiently for a second time to enhance the density and uniformity of the waterless foam, and make the foam liquid film evenly wrap the proppant.

A maximum diameter of the arc-shaped Venturi tube is 6.90 cm-7.60 cm, a minimum diameter of the same is 2.75 cm-3.25 cm, and an outside diameter of the same is 9.50 cm-10.00 cm.

Furthermore, 4-6 arc-shaped Venturi tubes are arranged in the second shaker of waterless foam fracturing fluid, and the maximum diameter of the arc-shaped Venturi tube is 6.90 cm-7.10 cm, the minimum diameter is 2.90 cm-3.10 cm, so as to achieve the beneficial effect of evenly dispersing $N_2$ and proppant with the liquid $CO_2$ film.

In the above-mentioned waterless foam generator, the third shaker of waterless foam fracturing fluid includes 4-10 arc-shaped Venturi tubes that are evenly spaced and 4-5 arc-shaped mini-Venturi tubes with the same size; the function of the arc-shaped mini-Venturi tubes is to make the three phases including $N_2$, proppant and liquid $CO_2$ oscillate and mix thoroughly, so as to produce stable foam with uniform particle size;

the maximum diameter of the arc-shaped Venturi tube is 6.90 cm-7.60 cm, the minimum diameter of the same is 2.75 cm-3.25 cm, and the outside diameter of the same is 9.50 cm-10.00 cm; the maximum diameter of the arc-shaped mini-Venturi tube is 1.50 cm-2.15 cm, and the minimum diameter of the same is 0.75 cm-1.25 cm.

Furthermore, 4-6 arc-shaped Venturi tubes are arranged in the third shaker of waterless foam fracturing fluid, and the maximum diameter of the arc-shaped Venturi tube is 6.90 cm-7.10 cm, the minimum diameter of the same is 2.90 cm-3.10 cm; the total length of the pipeline can be 60.00 cm-100.00 cm; 4-5 arc-shaped mini-Venturi tubes are arranged, the maximum diameter of the arc-shaped mini-Venturi tubes is 1.70 cm-1.80 cm, and the minimum diameter of the same is 0.80 cm-1.10 cm.

The injection of liquid $CO_2$ at the second feed port of $CO_2$ can improve the fluidity of proppant, the liquid $CO_2$ which has high viscosity, high density, and strong capacity of carrying proppant, which can prevent proppant from blocking the gate, and achieve the beneficial effect of reducing the amount of thickeners used and reducing the damage of thickeners on the stratum.

In order to prepare waterless foam fracturing fluid, the waterless foam generator for fracturing shale oil and gas reservoirs in the present disclosure is used according to the following steps:

(1) Adding Proppant and Testing Pressure

Connecting the discharge pipe of waterless foam of the waterless foam generator for fracturing shale oil and gas reservoirs to a high-pressure pipeline for fracturing which is in equipped with valves, and adding the proppant to the proppant storage tank through the proppant inlet; after adding proppant, sealing the proppant inlet with a flange, and closing the proppant inlet, the safety valve, the gas discharge pipe, the first feed port of liquid $CO_2$, the feed port of waterless foam foaming agent and the feed port of N2, feeding liquid $CO_2$ through the first feed port of liquid $CO_2$, keeping a pressure of 90 MPa for 30-40 minutes, and holding the pressure, and it is qualified if there is no piercing-caused leakage.

(2) Cooling

After testing pressure, injecting liquid $CO_2$ through the first feed port of liquid $CO_2$, and controlling the opening degree of the valves on the gas discharge pipe and the gate at the bottom of the proppant storage tank (to prevent the proppant from passing through), so as to make part of $CO_2$ be divided into the proppant storage tank and be discharged through the gas discharge pipe, the third shaker of waterless foam fracturing fluid and the discharge pipe of waterless foam in sequence; and so as to make the remaining part of $CO_2$ be divided into the first shaker of waterless foam fracturing fluid, the second shaker of waterless foam fracturing fluid and the third shaker of waterless foam fracturing fluid in sequence, and be discharged through the discharge pipe of waterless foam; when temperature of each part of the waterless foam generator is lowered to a temperature required for the fracturing operation, stop the waterless foam generator;

(3) Generating Foam

After cooling, closing the gas discharge pipe and fully opening the gate at the bottom of the proppant storage tank; injecting liquid $CO_2$ through the first feed port of liquid $CO_2$ and the second feed port of liquid $CO_2$, injecting $N_2$ through the feed port of $N_2$, injecting a foaming agent through the feed port of waterless foam foaming agent, and then fracturing; during a process of fracturing, controlling a flow rate at the first feed port of liquid $CO_2$, the second feed port of liquid $CO_2$ and the feed port of $N_2$, and controlling proppant concentration, so as to complete fracturing operation;

(4) Slagging

After the fracturing operation, releasing pressure in the waterless foam generator, orienting the discharge pipe of waterless foam in a safe direction, feeding high-pressure $CO_2$ through the first feed port of liquid $CO_2$, and discharging the proppant and residual foaming agent in the first shaker of waterless foam fracturing fluid, the second shaker of waterless foam fracturing fluid and the third shaker of waterless foam fracturing fluid.

In the above-mentioned method, the proppant concentration is determined according to the following equation in step (2):

$$\text{Proppant Concentration} = \frac{Q_{Proppant}}{Q_{N_2} + Q_1 + Q_2 + Q_{Foaming\ Agent}} = \frac{K_1 \times K_2 \times K_3 \times Q_2}{Q_{N_2} + Q_1 + Q_2 + Q_{Foaming\ Agent}}$$

In the equation, $Q_{Proppant}$ represents volumetric discharge amount of the proppant, $Q_{N_2}$ represents volumetric discharge amount of $N_2$, $Q_1$ represents volumetric discharge amount of liquid $CO_2$ at the first feed port of liquid $CO_2$, $Q_2$ represents volumetric discharge amount of the liquid $CO_2$ at the second feed port of liquid $CO_2$, $Q_{Foaming\ Agent}$ represents volumetric discharge amount of the foaming agent at the feed port of waterless foam foaming agent, $K_1$ represents a flow coefficient of $CO_2$, $K_2$ represents an opening coefficient of the hydraulic gate of the proppant storage tank, and $K_3$ represents a volumetric coefficient of the proppant (related to the shape of the particles, if spherical ceramic particles are used, $K_3 = V_{Ball}/V_{Cube} = 0.52$);

where, $K_2 = S_{Gap}/S_{Proppant\ Storage\ Tank} = 0.12$, $S_{Proppant\ Storage\ Tank}$ represents cross sectional area of the proppant storage tank, and $S_{Gap}$ represents cross sectional area of a gap between the hydraulic gate and the proppant storage tank when the hydraulic gate is open.

The present disclosure has the following beneficial effects:

(1) The waterless foam generator for fracturing shale oil and gas reservoirs provided by the present disclosure overcomes the difficulty of existing devices in forming waterless foam fracturing fluid, and can produce a waterless foam system with $N_2$ uniformly dispersed in liquid $CO_2$, at the same time waterless foam fluid and proppant can be fully mixed under a high pressure condition, and the proppant concentration in the waterless foam can be controlled, thereby producing a waterless foam fracturing liquid system which is suitable for the development of shale gas and oil.

(2) The present disclosure has designed three types of tandem oscillation with efficient foaming characteristics to ensure sufficient mixing of liquid $CO_2$, $N_2$, and proppant, strengthen the foaming capacity of the foaming agent used for waterless foam fracturing fluid, which can produce uniform and dense waterless foam fracturing fluid, thus better meeting the requirements of safety and efficiency in the development of shale gas and oil by fracturing, and helping to improve fracturing efficiency and greatly reduce damage to formation.

(3) The waterless foam generator according to the present disclosure takes into account the temperature sensitivity of viscosity, density and interfacial tension of liquid $CO_2$ in the waterless foam, $CO_2$ and a thermal insulation layer is provided on an outer surface of the foam generator to reduce the influence of the external ambient temperature during the formation of the waterless foam and ensure the stability of the waterless foam formation process.

(4) While mixing liquid $CO_2$ and $N_2$ to form waterless foam fracturing fluid, the concentration of the proppant in the waterless foam fracturing fluid can also be controlled, and the generator can withstand the strong impact of the proppant in the high flowing fracturing fluid, which ensures the safety of the waterless foam formation process with the proppant.

(5) The disclosure is convenient to install, simple to operate, and does not consume water resources during the operation, avoiding the risk of water pollution to formation water, surface water and soil, and can meet the requirements of the development of shale gas and shale oil in water-scarce and ecologically sensitive areas such as deserts, Gobi, mountainous areas, and hills.

1. body of the proppant storage tank; 2. cavity of the proppant storage tank; 3. proppant; 4. cavity of the hydraulic cylinder; 5. sealing ring; 6. oil inlet; 7. hydraulic shaft; 8. hydraulic gate; 9. conical funnel; 10. proppant inlet; 11. upper cover of the proppant storage tank; 12. second feed port of liquid $CO_2$; 13. safety valve, 14. feed port of $N_2$; 15. first feed port of liquid $CO_2$; 16. feed port of waterless foam foaming agent; 17. high-pressure gas-liquid-solid mixer; 18. liquid discharge pipe; 19. valve of the liquid discharge pipe; 20. wear-resistant ceramic layer; 21. triangle protrusion; 22. 24. 28. steel body; 23. thermal insulation layer; 25. 30. arc-shaped Venturi tube; 26. gas discharge pipe; 27. valve of the gas discharge pipe; 29. arc-shaped mini-Venturi tube, 31. discharge pipe of waterless foam; 32. proppant discharge pipe.

DETAILED DESCRIPTION OF THE EMBODIMENTS

Embodiments of the present disclosure will be further illustrated below with reference to the drawings, but the present disclosure will not be limited by the following embodiments.

Figure 1:
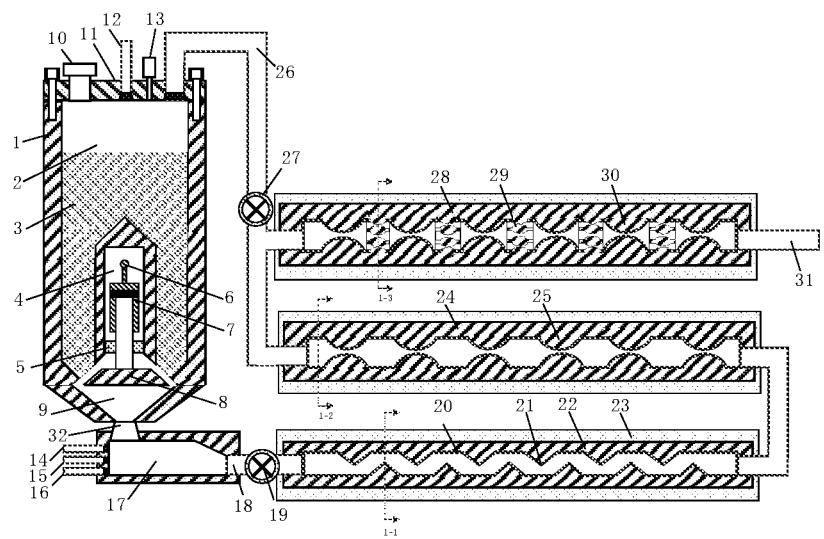
FIG. 1 is a schematic structural diagram of a waterless foam generator for fracturing shale oil and gas reservoirs according to the present disclosure.

As shown in FIG. 1, it is a schematic structural diagram of a waterless foam generator for fracturing shale oil and gas reservoirs according to the present disclosure, the waterless foam generator includes a proppant storage tank (including a body of the proppant storage tank 1 and a cavity of the proppant storage tank 2), a high-pressure gas-liquid-solid mixer 17, a first shaker of waterless foam fracturing fluid, a second shaker of waterless foam fracturing fluid and the third shaker of waterless foam fracturing fluid. Atop of the body of proppant storage tank 1 (an upper cover 11 of the proppant storage tank) is provided with a proppant inlet 10, a second feed port 12 of liquid $CO_2$ and a safety valve 13, and a bottom of the proppant storage tank is connected to the high-pressure gas-liquid-solid mixer 17 through a proppant discharge pipe 32; the upper cover 11 of the proppant storage tank is also equipped with a gas discharge pipe 26, and the other side of the gas discharge pipe 26 is connected to the second shaker of waterless foam fracturing fluid and the third shaker of waterless foam fracturing fluid. A side wall of the high-pressure gas-liquid-solid mixer 17 is provided with a first feed port 15 of liquid $CO_2$, a feed port 14 of $N_2$ and a feed port 16 of waterless foam foaming agent. The high-pressure gas-liquid-solid mixer 17 is connected to the first shaker of waterless foam fracturing fluid through a liquid discharge pipe 18, the first shaker of waterless foam fracturing fluid, the second shaker of waterless foam fracturing fluid and the third shaker of waterless foam fracturing fluid are connected in sequence, the third shaker of waterless foam fracturing fluid is connected to a discharge pipe 31 of waterless foam.

Figure 2:
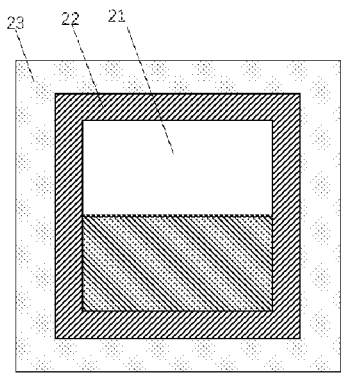
FIG. 2 is a sectional view of 1-1 in FIG. 1 (the first shaker of waterless foam fracturing fluid)

Specifically, as shown in FIG. 2, the first shaker of waterless foam fracturing fluid is a rectangular pipeline, where triangle protrusions 21 are alternately formed on two opposite side walls of the rectangular pipeline, and the apex angle of the triangle protrusion is 120°; the total length of the pipeline in the first shaker is 80.00 cm, the external width and height of the cuboid are 10.00 cm, and the thickness is 2.25 cm.

Figure 3:
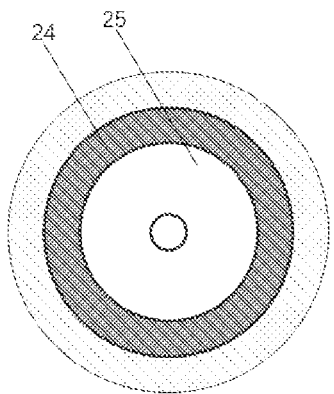
FIG. 3 is a sectional view of 1-2 in FIG. 1 (the second shaker of waterless foam fracturing fluid)

Specifically, as shown in FIG. 3, the second shaker of waterless foam fracturing fluid is a circular pipeline, a plurality of arc-shaped Venturi tubes 25 (formed by a steel body 24) are formed on the inner wall of the circular pipeline, the minimum diameter of the arc-shaped Venturi tube 25 is 3.00 cm, the maximum diameter of the same is 7.00 cm, the total length of the pipeline is 80.00 cm, and the outside diameter of alloy steel is 10.00 cm.

Figure 4:
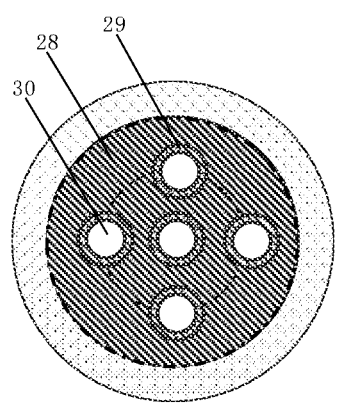
FIG. 4 is a sectional view of 1-3 in FIG. 1 (the third shaker of waterless foam fracturing fluid)
Figure 5:
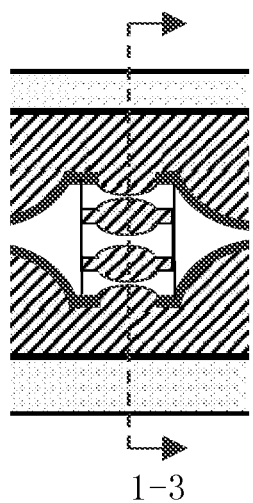
FIG. 5 is a partial enlarged drawing of 1-3 in FIG. 1 (the third shaker of waterless foam fracturing fluid).

Specifically, as shown in FIG. 4, the third shaker of waterless foam fracturing fluid is a circular pipeline, a plurality of arc-shaped Venturi tubes 30 (formed by a steel body 28) are formed on the inner wall of the circular pipeline, and a plurality of arc-shaped mini-Venturi tubes 29 are arranged, in honeycomb briquet shape, at an end of a radially enlarged tube of each of the arc-shaped Venturi tubes 30. The minimum diameter of the arc-shaped Venturi tube 30 is 3.00 cm, the maximum diameter of the same is 7.00 cm, the total length of the pipeline is 80.00 cm; the minimum diameter of five arc-shaped mini-Venturi tubes is 1.00 cm, and the maximum diameter of the same is 1.75 cm, and the outside diameter of alloy steel is 10.00 cm.

The pipe wall of the first shaker of waterless foam fracturing fluid, the second shaker of waterless foam fracturing fluid and the third shaker of waterless foam fracturing fluid is composed of a wear-resistant ceramic layer 20, a steel body 22 (24, 28) and a thermal insulation layer 23 from the inside to the outside.

In order to control the discharge amount of the proppant, a hydraulic sealing gate is arranged within the proppant storage tank, where the hydraulic sealing gate includes a hydraulic cylinder arranged in the proppant storage tank (the cavity of the hydraulic cylinder 4), a hydraulic shaft 7 which is connected to the hydraulic cylinder, an oil inlet 6 which is fixed on a top of the hydraulic shaft 7 and a hydraulic gate 8 fixed at a bottom of the hydraulic shaft, the discharge amount of the proppant is controlled by upward or downward movement of the hydraulic gate 8. A sealing ring 5, such as a graphite sealing ring, is arranged between the hydraulic cylinder and the hydraulic shaft 7, in order to achieve beneficial effects of resistance to the corrosion of liquid $CO_2$ and high pressure. The bottom of the proppant storage tank has a shape of a conical funnel 9, a cone apex of which is connected to the proppant discharge pipe 32.

In order to prepare waterless foam fracturing fluid, the waterless foam generator for fracturing shale oil and gas reservoirs in the present disclosure is used according to the following steps:

(1) Adding proppant and testing pressure: connecting the discharge pipe 31 of waterless foam of the waterless foam generator for fracturing shale oil and gas reservoirs to a high-pressure pipeline for fracturing which is in equipped valves, and adding the proppant 3 through the proppant inlet; after adding proppant, sealing the proppant inlet with a flange, and closing the proppant inlet, the safety valve 13, the gas discharge pipe 26, the first feed port 15 of liquid $CO_2$, the feed port 16 of waterless foam foaming agent and the feed port 14 of $N_2$, feeding liquid $CO_2$ through the first feed port 15 of liquid $CO_2$, keeping a pressure of 90 MPa for 30-40 minutes, and holding the pressure, and it is qualified if there is no piercing-caused leakage.

(2) Cooling: after testing pressure, injecting liquid $CO_2$ through the first feed port 15 of liquid $CO_2$, and controlling the opening degree of the valves on the gas discharge pipe 27 and the hydraulic gate 8, so as to make part of $CO_2$ be divided into the proppant storage tank and be discharged through the gas discharge pipe 26, the third shaker of waterless foam fracturing fluid and the discharge pipe 31 of waterless foam in sequence; and so as to make the other part of $CO_2$ be divided into the first shaker of waterless foam fracturing fluid, the second shaker of waterless foam fracturing fluid and the third shaker of waterless foam fracturing fluid in sequence, and be discharged through the discharge pipe 31 of waterless foam; when temperature of each part of the waterless foam generator is lowered to a temperature required for the fracturing operation, stop the waterless foam generator.

(3) Generating foam: after cooling, closing the gas discharge pipe 26 and fully opening the hydraulic gate 8 of the proppant storage tank; injecting liquid $CO_2$ through the first feed port 15 and the second feed port 12 of liquid $CO_2$, injecting $N_2$ through the feed port 14 of $N_2$, injecting a foaming agent through the feed port 16 of waterless foam foaming agent, and then fracturing; during a process of fracturing, controlling a flow rate of the first feed port 15 of liquid $CO_2$, the second feed port 12 of liquid $CO_2$ and the feed port 14 of $N_2$, and controlling proppant concentration, so as to complete fracturing operation.

(4) Slagging: after the fracturing operation, releasing pressure in the waterless foam generator, orienting the discharge pipe 31 of waterless foam in a safe direction, feeding high-pressure $CO_2$ through the first feed port 15 of liquid $CO_2$, and discharging the proppant 3 and residual foaming agent in the first shaker of waterless foam fracturing fluid, the second shaker of waterless foam fracturing fluid and the third shaker of waterless foam fracturing fluid.

In step (2), the relationship between the proppant concentration and the amount of usage of liquid $CO_2$ at the first feed port 15 and the second feed port 12, the amount of usage of $N_2$ at the feed port 14, and the amount of usage of proppant at the proppant inlet 10 is shown in the following equation:

$$\text{Proppant Concentration} = \frac{Q_{Proppant}}{Q_{N_2} + Q_1 + Q_2 + Q_{Foaming\ Agent}} = \frac{K_1 \times K_2 \times K_3 \times Q_2}{Q_{N_2} + Q_1 + Q_2 + Q_{Foaming\ Agent}}$$

In the equation, $Q_{Proppant}$ represents volumetric discharge amount of the proppant, $Q_{N2}$ represents volumetric discharge amount of $N_2$, $Q_1$ represents volumetric discharge amount of liquid $CO_2$ at the first feed port of liquid $CO_2$, $Q_2$ represents volumetric discharge amount of liquid $CO_2$ at the second feed port of liquid $CO_2$, $Q_{Foaming\ Agent}$ represents volumetric discharge amount of the foaming agent at the feed port of waterless foam foaming agent, $K_1$ represents a flow coefficient of $CO_2$ ($K_1=8.0$), $K_2$ represents an opening coefficient of the hydraulic gate of the proppant storage tank (determined before the fracturing operation, $K_2=S_{Gap}/S_{Proppant\ Storage\ Tank}=0.12$, $S_{Proppant\ Storage\ Tank}$ represents cross sectional area of the proppant storage tank, and $S_{Gap}$ represents cross sectional area of a gap between the hydraulic gate and the proppant storage tank when the hydraulic gate is open), and $K_3$ represents a volumetric coefficient of the proppant (related to the shape of the particle, if spherical ceramic particles are used, $K_3=V_{Ball}/V_{Cube}=0.52$);

In the process of fracturing operation, the total designed discharge amount in the fracturing operation is 8 m³/min, $Q_{N2}=3.98$ m³/min, $Q_{Foaming\ Agent}=0.02$ m³/min, proppant concentration is 8%, and finally the discharge amount of $CO_2$ during the fracturing operation can be determined, $Q_1=2.18$ m³/min, $Q_2=1.18$ m³/min.

What is claimed is:

1. A waterless foam generator for fracturing shale oil and gas reservoirs, comprising: a proppant storage tank, a high-pressure gas-liquid-solid mixer, a first shaker of waterless foam fracturing fluid, a second shaker of waterless foam fracturing fluid, and a third shaker of waterless foam fracturing fluid;

a top of the proppant storage tank is provided with a proppant inlet, a second feed port of liquid $CO_2$ and a safety valve, and a bottom of the proppant storage tank is connected to the high-pressure gas-liquid-solid mixer through a proppant discharge pipe;

the top of the proppant storage tank is connected to both the second shaker of waterless foam fracturing fluid and the third shaker of waterless foam fracturing fluid through a gas discharge pipe;

a side wall of the high-pressure gas-liquid-solid mixer is provided with a first feed port of liquid $CO_2$, a feed port of $N_2$ and a feed port of waterless foam foaming agent;

the high-pressure gas-liquid-solid mixer is connected to the first shaker of waterless foam fracturing fluid through a liquid discharge pipe, the first shaker of waterless foam fracturing fluid, the second shaker of waterless foam fracturing fluid and the third shaker of waterless foam fracturing fluid are connected in sequence;

the first shaker of waterless foam fracturing fluid is a rectangular pipeline, wherein triangle protrusions are alternately formed on two opposite side walls of the rectangular pipeline;

the second shaker of waterless foam fracturing fluid is a circular pipeline, wherein a plurality of arc-shaped Venturi tubes are formed along the inner wall of the circular pipeline;

the third shaker of waterless foam fracturing fluid is a circular pipeline, wherein a plurality of arc-shaped Venturi tubes are formed along the inner wall of the circular pipeline, and a plurality of arc-shaped mini-Venturi tubes are arranged, in honeycomb briquet shape, at an end of a radially enlarged tube of each of the arc-shaped Venturi tubes;

the third shaker of waterless foam fracturing fluid is connected to a discharge pipe of waterless foam.

2. The waterless foam generator according to claim 1, wherein a hydraulic sealing gate which is configured to control discharge amount of the proppant is arranged within the proppant storage tank.

3. The waterless foam generator according to claim 2, wherein the hydraulic sealing gate comprises a hydraulic cylinder arranged in the proppant storage tank, a hydraulic shaft connected to the hydraulic cylinder, an oil inlet fixed on a top of the hydraulic shaft and a hydraulic gate fixed at a bottom of the hydraulic shaft, and the discharge amount of the proppant is controlled by upward or downward movement of the hydraulic gate.

4. The waterless foam generator according to claim 3, wherein the bottom of the proppant storage tank has a shape of a conical funnel, a cone apex of which is connected to the proppant discharge pipe.

5. The waterless foam generator according to claim 1, wherein both the circular pipeline of the second shaker and the third shaker, and the rectangular pipeline are each steel pipe, an outer surface of the each steel pipe is provided with a thermal insulation layer, and an inner surface of the steel pipe is inlaid with a wear-resistant ceramic layer.

6. The waterless foam generator according to claim 1, wherein an apex angle of the triangle protrusion is 110°-130°; a maximum diameter of the arc-shaped Venturi tube is 6.90 cm-7.60 cm, and a minimum diameter of the arc-shaped Venturi tube is 2.75 cm-3.25 cm; a maximum diameter of the arc-shaped mini-Venturi tube is 1.50 cm-2.15 cm, and a minimum diameter of the arc-shaped mini-Venturi tube is 0.75 cm-1.25 cm.

\* \* \* \* \*